Sept. 26, 1961     W. D. SCHMITZ ET AL     3,002,154
PULSE AMPLITUDE DETECTION SYSTEM
Filed June 10, 1960
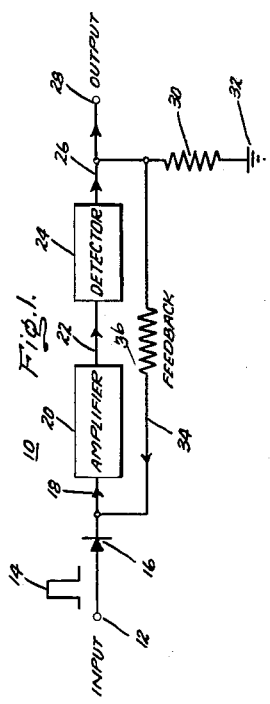
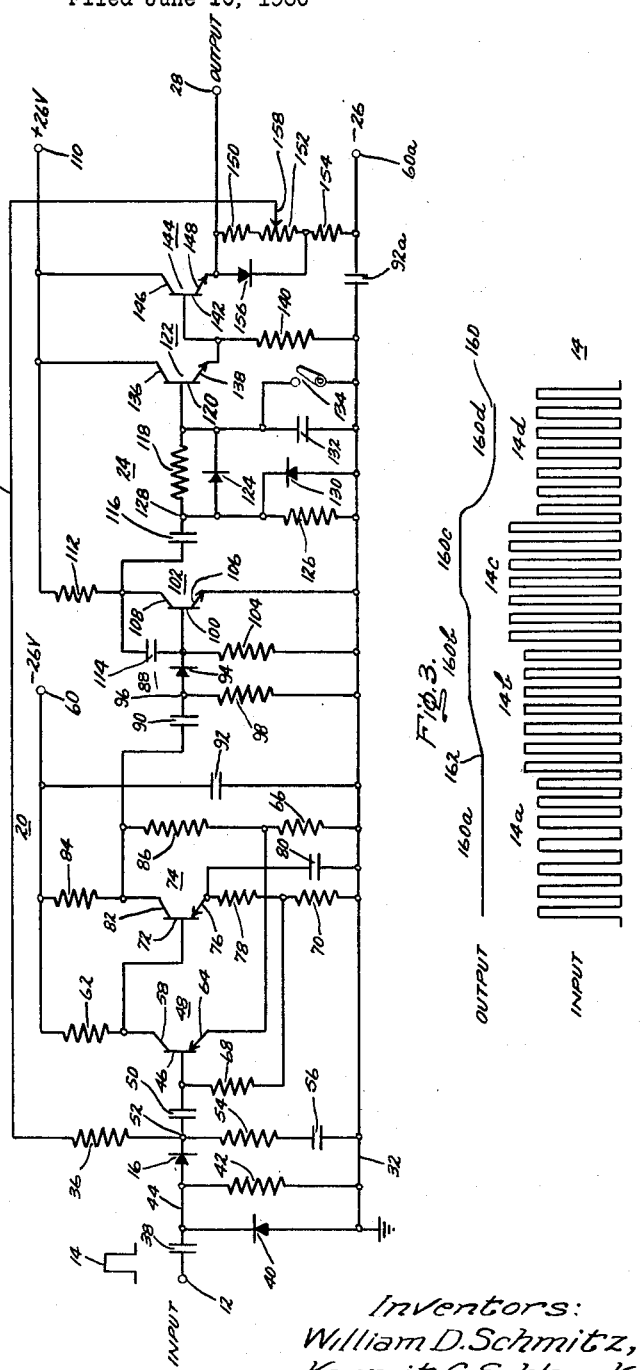
Inventors:
William D. Schmitz,
Kermit C. Schlansker,
by Lust & Oish
Attorneys.

ved Sept. 26, 1961

United States Patent Office 3,002,154
Patented Sept. 26, 1961

3,002,154
PULSE AMPLITUDE DETECTION SYSTEM
William D. Schmitz and Kermit C. Schlansker, Fort Wayne, Ind., assignors to International Telephone and Telegraph Corporation
Filed June 10, 1960, Ser. No. 35,166
4 Claims. (Cl. 329—109)

This invention relates generally to pulse amplitude detection systems and more particularly to a system for detecting the peak-to-peak amplitude of a train of recurrent pulses and for providing a direct current output signal having a level proportional thereto.

In certain electronic systems in which a train of recurrent pulses are provided, it is desirable to incorporate circuitry which will detect the peak-to-peak amplitude of such recurrent pulses and provide a direct current output signal having a level proportional thereto; such an output signal is useful in other measuring or voltage comparison circuitry. In the past, such pulse amplitude detection has been accomplished by the employment of conventional rectifiers with resistance-capacitance filter networks. However, to the best of the present applicants' knowledge, such prior systems are not capable of detecting pulses having considerable variation in rise time, pulse shape, or repetition rate. It is therefore desirable to provide an improved pulse amplitude detection system of the type described which will detect pulses with considerable independence of the pulse rise time, pulse shape, or pulse repetition rate.

It is therefore an object of our invention to provide an improved pulse amplitude detection system.

Another object of our invention is to provide an improved system for detecting the peak-to-peak amplitude of a train of recurrent pulses and for providing a direct current output signal having a level proportional thereto.

Our invention, in its broader aspects, provides a diode polarized to receive and pass the recurrent input pulses and a servo loop comprising an input circuit coupled to the diode, amplifier means, pulse amplitude detector means and output signal feedback means, the servo loop forming with the diode a servo controlled diode pulse gate. In this system, the diode gate conduction point is determined by the direct current level of the output signal; a small difference signal between the input pulse amplitude and the level of the direct current output signal is maintained by the feedback loop of the servo system, this difference signal being amplified and detected to sustain the output level.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a block diagram illustrating the fundamentals of our invention;

FIG. 2 is a schematic diagram illustrating the preferred embodiment of our invention; and FIG. 3 is a diagram illustrating a train of input pulses and the direct current output signal level provided in response thereto by the system of our invention.

Referring now to FIG. 1, the pulse amplitude detection system of our invention, generally identified at 10, comprises an input terminal 12 for connection to a source of recurrent input pulses 14, shown here as being positive-going. Diode 16 is coupled to input terminal 12 and is polarized to pass the recurrent input pulses 14, as shown. Diode 16 is in turn coupled to input circuit 18 of amplifier 20 which in turn has its output circuit 22 coupled to full-wave peak-to-peak detector 24. The detector 24 in turn has its output circuit 26 coupled to output terminal 28 with load impedance 30 being coupled to a source of reference potential 32, shown here as being ground. In accordance with out invention, a feedback circuit 34, including a relatively high impedance, shown here as being resistance 36, is coupled between output circuit 26 of detector 24 and input circuit 18 of amplifier 20; it will be seen that feedback circuit 34 is coupled to the side of diode 16 remote from input terminal 12.

It will be perceived that amplifier 20, peak-to-peak detector 24, output circuit 26, 30 and feedback circuit 34 form a servo loop with its input circuit coupled to diode 16. Thus, it will be seen that a voltage proportional to the output voltage at terminal 28 will be applied to back-bias diode 16. Thus, the conduction point of diode 16 is determined by the direct current level of the output signal in output circuit 26, 30 so that the pulses impressed upon the amplifier 20 are difference or error pulses, the amplitude thereof being the difference between the amplitude of the input pulses 14 and the level of the direct current output signal. These error pulses are then amplified, preferably stretched, as will be hereinafter more fully described, and detected in full wave peak-to-peak detector 24 to maintain a direct current output signal level proportional to the peak-to-peak amplitude of the train of recurrent input pulses 14.

Referring now to FIG. 2 in which there is shown a specific embodiment of our invention, a coupling capacitor 38 serially connects input terminal 12 to the comparator or gate diode 16. Diode 40 and resistor 42 are connected in parallel between conductor 44 which connects capacitor 38 and diode 16, and ground 32, diode 40 and resistor 42 forming a conventional direct current restorer or diode clamp which clamps the input pulses 14 to a source of reference potential, in this case ground 32.

Diode 16 is in turn coupled to base 46 of transistor 48 by coupling capacitor 50 with point 52 intermediate comparator diode 16 and capacitor 50 being coupled to ground 32 by serially connected resistor 54 and capacitor 56; resistor 54 and capacitor 56 form a high frequency bypass as is well known to those skilled in the art. Collector 58 of transistor 48 is connected to a suitable source 60 of negative potential, such as −26 volts, by a suitable resistor 62. Emitter 64 is connected to ground 32 by resistor 66. Base-bias for transistor 48 is provided by resistors 68 and 70 serially connected between base 46 and ground 32.

Transistor 48 and its associated circuitry form a conventional alternating current or video amplifier. Collector 58 of transistor 48 is directly coupled to base 72 of transistor 74, which, with its associated circuitry forms an alternating current power amplifier. Emitter 76 of transistor 74 is coupled to ground by serially connected resistors 78 and 70 with capacitor 80 being connected in parallel therewith, as shown. Collector 82 of transistor 74 is connected to source 60 of negative 26 volt potential by resistor 84. Collector 82 is coupled to ground by serially connected resistors 86 and 66, as shown, and to pulse stretching circuit 88 by coupling capacitor 90. Source 60 of negative 26 volt potential is coupled to ground by capacitor 92, as shown.

Pulse stretching network 88, which is provided to add more energy to the pulses provided by amplifier 74, includes a diode 94 serially connected to coupling capacitor 90 with midpoint 96 between capacitor 90 and diode 94 being connected to ground by resistor 98. Diode 94 is in turn directly connected to base 100 of transistor 102, base 100 being connected to ground by resistor 104. Transistor 102 and its associated circuitry form an alternating current voltage amplifier which is a part of stretching network 88. Emitter 106 of transistor 102 is directly connected to ground and collector 108 is connected to a suitable source 110 of positive potential, such as +26 volts by resistor 112. Capacitor 114 is connected between base 100 and collector 108 of transistor 102. It will now be seen that the amplifiers formed by transistors 48 and 74, together with the pulse stretching network 88 form the amplifier 20 schematically identified in FIG. 1.

Collector 108 of transistor 102 is coupled to full wave peak-to-peak detector 24 by coupling capacitor 116. Peak-to-peak detector 24 comprises a resistor 118 serially connected between capacitor 116 and base 120 of transistor 122. Diode 124 is connected in parallel with resistor 118 and resistor 126 is connected between point 128 intermediate capacitor 116 and resistor 118 and ground, as shown. Diode 130 is connected in parallel with resistor 126 and filter capacitor 132 is connected between base 120 of transistor 122 and ground, as shown. A discharging or "dump" circuit for capacitor 132 is provided by switch 134 connected to short circuit capacitor 132, as shown. It will now be seen that the full wave peak-to-peak detector 24, along with filter capacitor 132 provides a direct current output signal having a level equal to the peak-to-peak amplitude of the pulses impressed thereon.

Collector 136 of transistor 122 is directly connected to source 110 of positive potential and emitter 138 is connected to ground by emitter resistor 140. Emitter 138 is also directly connected to base 142 of transistor 144 in an emitter-follower configuration. Collector 146 of transistor 144 is directly connected to source 110 of positive potential, and emitter 148 is connected to output terminal 28. Emitter 148 is also connected to source 60(a) of −26 volt potential by serially connected resistor 150, potentiometer 152 and resistor 154. Compensating diode 156 is connected in parallel across resistor 150 and potentiometer 152. Source 60(a) is connected to ground 32 by capacitor 92(a); it will be understood that if sources 60 and 60(a) are in fact the same source, capacitors 92 and 92(a) may in fact be the same capacitor.

Adjustable element 158 of potentiometer 152 is connected to point 52 intermediate comparator diode 16 and capacitor 50 by resistor 36, thereby forming feedback circuit 34.

It will now be seen that a direct current voltage proportional to the output voltage appearing at output terminal 28 derived from potentiometer 152 by adjustable element 158 is impressed upon diode 16 remote from input terminal 12 by feedback circuit 34, thus back-biasing diode 16 with a direct current voltage proportional to the direct current output voltage level. Thus, diode 16 will conduct only when the amplitude of pulses 14 exceeds the level of the back-bias voltage applied by the feedback circuit 34. The servo loop described above is therefore provided by which error pulses only are supplied to amplifier 20 and after amplification to detector 24 so that the level of the direct current output signal at output terminal 28 is maintained at a level proportional to the amplitude of the recurrent input pulses 14 by feedback.

In FIG. 3, a train of input pulses 14 is shown, having amplitudes 14(a), 14(b) and 14(d), as shown. The level of the resulting direct current output signal 28 is shown at 160 and it will be seen that the level varies at 160(a), 160(b), 160(c) and 160(d) in response to the different input pulse amplitudes 14(a) through 14(d), respectively. Since our system operates as a servo controlled pulse gate, it will be readily understood that there will be a delay of several input pulses before a change in input pulse amplitude is reflected in the output signal level, as shown for example at 162. However, since our system is suitable for use with pulses having a repetition frequency which may for example be 10,000 cycles per second, it is readily apparent that a delay of three or four cycles in the response time of the system is of no practical consequence.

In an actual system constructed in acocrdance with FIG. 2, the following component values were employed:

| Component | Unit | Value |
|---|---|---|
| Diode 16 | | 1N251 |
| Resistor 36 | ohms | 100,000 |
| Capacitor 38 | microfarads | .1 |
| Diode 40 | | 1N277 |
| Resistor 42 | megohms | 1 |
| Transistor 48 | | 2N384 |
| Capacitor 50 | microfarads | .01 |
| Resistor 54 | ohms | 1,000 |
| Capacitor 56 | micromicrofarads | 820 |
| Resistor 62 | ohms | 4,700 |
| Resistor 66 | do | 33 |
| Resistor 68 | do | 2,200 |
| Resistor 70 | do | 100 |
| Transistor 74 | | 2N384 |
| Resistor 78 | ohms | 220 |
| Capacitor 80 | microfarads | 60 |
| Resistor 84 | ohms | 1,500 |
| Resistor 86 | do | 3,300 |
| Capacitor 90 | microfarads | .01 |
| Capacitor 92 | do | 1 |
| Capacitor 92a | do | 1 |
| Diode 94 | | 1N198 |
| Resistor 98 | ohms | 10,000 |
| Transistor 102 | | 2N167 |
| Resistor 104 | ohms | 4,700 |
| Resistor 112 | do | 10,000 |
| Capacitor 114 | micromicrofarads | 100 |
| Capacitor 116 | microfarads | .01 |
| Resistor 118 | megohms | 1 |
| Transistor 122 | | 2N335 |
| Diode 124 | | 1N457 |
| Resistor 126 | megohms | 1 |
| Diode 130 | | 1N457 |
| Capacitor 132 | microfarads | 1 |
| Resistor 140 | megohms | 1 |
| Transistor 144 | | 2N167 |
| Resistor 150 | ohms | 2,200 |
| Potentiometer 152 | do | 500 |
| Resistor 154 | do | 15,000 |
| Diode 156 | | 1N198 |

While the system of FIG. 2 is shown as receiving positive-going pulses 14, it will be readily apparent that it is equally employable with negative-going pulses, either by inserting an inverting circuit immediately ahead of input terminal 12, or by employing PNP transistors in the system rather than the NPN transistors 102, 122 and 144, reversing the polarities of the potentials impressed thereon, and reversing the polarization of diodes 16, 94 and 156.

While we have described above the principles of our invention in connection with specific apparatus, it is to be clearly understood that this description is made only by way of example and not as a limitation to the scope of our invention.

What is claimed is:

1. A system for detecting the amplitude of a train of recurrent pulses comprising; an input circuit for receiving said pulse; a diode coupled in series with said input circuit and polarized to pass said pulses; pulse stretching means and alternating current voltage amplifier means serially coupled with said diode; full wave peak-to-peak detector means coupled to said pulse stretching and amplifier means; an output circuit including a filter capacitor coupled to said detector means for providing a direct current output signal; and a feedback connection between said output circuit and the side of said diode remote from said input circuit for back-biasing said diode with a feedback signal proportional to said output signal and having the same polarity as said input pulses; said pulse stretching and amplifying means, detector means, output circuit and feedback connection forming a servo loop controlling conduction of said diode to provide difference signal pulses having an amplitude between the input pulse amplitude and the feedback signal amplitude which are amplified, stretched and detected to maintain said output signal at a direct current level proportional to the peak-to-peak amplitude of said input pulses.

2. The combination of claim 1 further comprising means for selectively discharging said filter capacitor to a source of reference potential thereby to reduce the level of said output signal substantially to the level of said reference potential source.

3. A system for detecting the amplitude of a train of recurrent input pulses comprising: an input circuit for receiving said pulses; a direct current restorer circuit coupled to said input circuit for clamping said input pulses to a source of reference potential; a comparator diode serially connected to said restorer circuit and polarized to pass said clamped input pulses; an alternating current amplifier coupled to said comparator diode for amplifying the power of the pulses passed thereby; a pulse stretching circuit coupled to said power amplifier for increasing the energy in said amplified pulses; an alternating current voltage amplifier coupled to said pulse stretching circuit for amplifying the voltage of the pulses passed thereby; a full wave diode peak-to-peak detector circuit coupled to said voltage amplifier for providing a direct current signal responsive to the peak-to-peak amplitude of the pulses from said voltage amplifier; an output circuit including a filter capacitor coupled across said detector for providing a direct current output signal; and a feedback circuit including a relatively high direct current impedance element connected between said output circuit and the side of said comparator diode remote from said restorer circuit for back-biasing said comparator diode with a feedback signal proportional to said output signal and having the same polarity as said clamped pulses; said pulse stretching circuit, amplifier, detector, output circuit and feedback circuit forming a servo loop controlling the conduction of said diode to provide an error signal which is the difference between the amplitude of said clamped pulses and the amplitude of said feedback signal and which is amplified, stretched and detected to maintain said output signal at a direct current level proportional to the amplitude of said input pulses.

4. A system for detecting the amplitude of a train of recurrent pulses comprising; an input circuit for receiving said pulses; a diode coupled in series with said input circuit and polarized to pass said pulses; amplifying means coupled to said diode; peak-to-peak detector means coupled to said amplifying means; said amplifying means being an alternating current voltage amplifier having a predetermined gain, and said detector means being a full-wave peak-to-peak detector; an output circuit coupled to said detector means for providing a direct current output signal; and a feedback circuit coupled between said output circuit and the side of said diode remote from said input circuit for back-biasing said diode with a feedback signal proportional to said output signal and having the same polarity as said input pulses; said amplifying means, detector means and feedback circuit forming a servo loop controlling conduction of said diode to provide difference signal pulses having an amplitude between the input pulse amplitude and the feedback signal amplitude which are amplified and detected to maintain said output signal at a direct current level proportional to the amplitude of said input pulses.

References Cited in the file of this patent

UNITED STATES PATENTS 2,708,736    Creveling et al.    May 17, 1955